Patented June 13, 1950

2,511,423

UNITED STATES PATENT OFFICE 2,511,423

PRODUCTION OF ENOL ACETATES

Frank G. Young, Charleston, W. Va., assignor, by mesne assignments, to Union Carbide and Carbon Corporation, a corporation of New York No Drawing. Application March 19, 1949,
Serial No. 82,493

6 Claims. (Cl. 260—488)

This invention relates to the production of enol acetates, and more especially it concerns a process for the condensation of ketene with monoketones and ketonic compounds such as β- and γ-diketones and ketonic carboxylic acid esters having at least three hydrogen atoms connected with the carbon atoms alpha to a keto carbon atom, for the production of acetoxy-substituted alkenes or enol acetates, including acetoxy derivatives of unsaturated carboxylic esters. When reacting ketene with monoketones by the process enol acetates are produced; when reacting diketones, mono-enol acetates are produced; and when reacting ketonic carboxylic acid esters, the enol acetate products are acetoxy derivatives of unsaturated carboxylic esters.

The invention is based in part upon the discovery that by condensing ketene with such ketones and ketonic compounds, and particularly those having only hydrogen, carbon and oxygen, with or without a halogen in the molecule, in the presence of a certain class of heterogeneous catalysts for the condensation which are insoluble in such ketones and ketonic compounds and in the enol acetates produced, not only is the condensation effected with good yields of the said enol acetates and with good efficiencies but, moreover, the catalyst can be removed readily from the reaction mixture by simple filtration, settling or decantation, thereby eliminating such costly process steps as neutralization, precipitation or distillation required in prior processes for removal of the homogeneous catalysts commonly used. Furthermore, it has been established that the catalysts of this invention, when recovered by filtration or the equivalent, are in active state and are suitable for reuse in the process with substantially undiminished efficiency without further treatment. Indeed, such catalysts can be thus reused until they disappear because of mechanical attrition, thereby greatly decreasing catalyst costs. The problem of tar removal from the reaction products is much lessened because the new catalysts have a smaller tendency to catalyze polymerization reactions that produce by-product tars.

The ketonic compounds which can be converted by the process include those aliphatic, aromatic and mixed open chain and cyclic mono-ketones having at least three replaceable hydrogen atoms attached to the carbon atoms directly connected with a carbonyl carbon atom of such ketone, and with corresponding ketonic compounds, including β- and γ-diketones and halogenated ketones and keto-carboxylic acid esters.

Among ketones and other ketonic compounds convertible by the process to enol acetates are saturated aliphatic ketones such as acetone, methyl ethyl ketone, methyl isobutyl ketone, ethyl n-hexyl ketone, diisobutyl ketone, and di-n-caprone; olefinic ketones such as ethylidene acetone, and mesityl oxide; saturated cyclic ketones such as cyclopentanone, cyclohexanone and cyclononanone; unsaturated cyclic ketones such as isophorone; and aromatic and mixed aromatic ketones such as acetophenone and methyl benzyl ketone; β-diketones such as acetylacetone, the alkyl acetylacetones, benzoylacetone, acetylpropionylmethane ($CH_3COCH_2COC_2H_5$), and acetylbutyrylmethane ($CH_3COCH_2COC_3H_7$); γ-diketones such as acetonyl acetone; saturated and olefinic halogenated ketones such as chloroacetone, bromoacetone, β-chloroethyl methyl ketone, β-chloropropenyl methyl ketone, o-, m-, and p-chloroacetophenone and o-, m-, and p-fluoroacetophenone; β-ketocarboxylic acid esters such as the methyl, ethyl, propyl, butyl and higher esters of acetoacetic acid (β-ketobutyric acid), α-methylacetoacetic acid, α-ethylacetoacetic acid, propylacetoacetic acid, propionylacetic acid, α-butyrylbutyric acid, pyruvic acid and γ-ketocarboxylic acids such as levulinic acid.

When using the vinyl ketones such as methyl and ethyl vinyl ketone in the process, it is preferred to use lower reaction temperatures—e. g., 0° C.—than those generally used when condensing ketene and other ketonic compounds, as hereinafter recited.

The active reaction promoters or catalysts useful for the production of enol acetates in accordance with the invention are solid heterogeneous products of the sulfonation of normally solid natural and artificial carbonaceous materials containing fixed carbon under conditions whereby the material is partially oxidized and contains both the sulfonic acid group and the caboxylic acid group in substantial amounts. By the term "fixed carbon" is meant carbon which is not in the form of compounds volatilizable at temperatures below their thermal decomposition temperature.

In a preferred procedure for the preparation of these catalysts, a solid carbonaceous material, such as wood and mechanical and chemical wood pulps, vegetable charcoals, graphites, bituminous and anthracite coals, high and low temperature cokes from coal and pertoleum, and polyethylenes, in finely divided form, is treated with a sulfonating and an oxidizing agent under conditions introducing into the material sulfonic acid groups, —$SO_3H$, and carboxylic acid groups, —COOH. Other carbonaceous materials of vegetable or cellulosic origin such as semi- and sub-bituminous coals, lignite and peat; those of animal origin such as animal bone charcoal; and cellulosic materials such as cotton; asphalt coke; and synthetic resins having softening points above the temperature of the condensation reaction, and preferably above 100° C., also are useful as starting materials in preparing the sulfonated and carboxylated reaction promoter. The particle size of the catalysts is not critical. Materials within the range from above 100 to 4 mesh have been used effectively.

Suitable agents for concurrently effecting both the sulfonation and oxidation of these carbonaceous materials are concentrated sulfuric acid, fuming sulfuric acid, chlorosulfonic acid and sulfur trioxide. Chlorosulfonic acid has a much milder oxidizing effect than the other sulfonating agents mentioned. The sulfonation and oxidation of the carbonaceous material may be effected in separate steps, if desired, in which case an oxidizing agent such as nitric acid can be used following the sulfonation by one of the well-known sulfonation agents.

The amount of sulfonating-oxidizing agent employed in preparing the catalyst may vary from a few per cent—e. g., 10%—to 40%–50% by weight of the dry carbonaceous material being treated. Higher percentages apparently serve no chemically useful purpose. The sulfonation and the oxidation preferably are conducted at temperatures within the range from 30° C. to 120° C. At higher temperatures substantial losses of the carbonaceous material occur due to formation of gaseous products—e. g.,—$CO_2$, $SO_2$, etc. The time of treatment can be varied from a few minutes to several hours, depending upon the state of aggregation of the carbonaceous material, and is determined by individual experiment.

The sulfonic acid content of the catalyst is determined by measuring the increase in sulfur content on sulfonation, such increase being attributed to sulfonic acid. The carboxylic acid content is measured as the difference between the sulfonic acid content of the catalyst and the total acid content of the latter as determined by potentiometric titration of the excess of a standard sodium hydroxide solution over the amount required to neutralize the catalyst. This residual acidity is attributed to the carboxylic acid groups. The results of the determinations are converted to milliequivalents of acidity per gram of catalyst to give comparable values. With a few infusible carbon-containing materials such as graphite this method of analysis is not possible.

After the sulfonation and oxidation the product is freed from the excess sulfonating and oxidizing agent or agents generally by washing with water until the effluent water is free from the sulfate ion. The material then is drained and dried in the air at room temperature or at elevated temperatures below its kindling temperature.

It is believed that the activity of these heterogeneous reaction promoters is due to the presence of both the sulfonic acid group and the carboxylic acid group. This is exemplified in the following two sets of runs wherein about 120 grams of ketone were slowly introduced into an agitated suspension of about 60 grams of the catalyst in about 420 grams of the ketone during 3 hours. The catalyst then was removed by filtration, and the filtrate was fractionally distilled under vacuum to eliminate unreacted ketone, and the enol acetate recovered.

In the first set of two runs, the results of which are shown in Table I, the ketone used was acetone, and the reaction temperature was 55° C.–60° C. In the second set of runs, the ketone was diisobutyl ketone, and the reaction temperature used was 80° C.–92° C.

Catalyst No. 1 was made by agitating a mixture of 100 grams of a 20–40 mesh bituminous coal containing 1.32% sulfur and 0.07 milliequivalents of total acid per gram and 400 cc. of 96% sulfuric acid while heating at 80° C. for 2.5 hours. The resultant swollen coal particles were washed with distilled water until the effluent was free from sulfate ion. The material then was dried in an oven at 100° C. It contained 6.87% sulfur, and 2.23 milliequivalents of total acid per gram corresponding to the introduction of 1.74 milliequivalents of sulfonic acid per gram of catalyst and to the introduction of 0.426 milliequivalents of carboxylic acid groups per gram of catalyst.

Catalyst No. 2 was made in manner similar to catalyst No. 1, but using 400 grams of chlorosulfonic acid (having a milder oxidizing effect) in place of the fuming sulfuric acid. The catalyst was washed until free from both sulfate and chloride ions. Analysis showed 9.22% of sulfur, equivalent to the introduction of 2.45 milliequivalents of sulfonic acid per gram of catalyst, and very little additional acidity not contributed by the sulfonic acid group.

*Table I*

| Catalyst | Ketone | Yield of Enol Acetate | | Efficiency | |
|---|---|---|---|---|---|
| | | on Ketone, Per cent | on Ketene, Per cent | on Ketone, Per cent | on Ketene, Per cent |
| 1 | Acetone | 27.4 | 64.7 | 72 | 64.7 |
| 2 | do | 12.2 | 39.6 | 42.5 | 39.6 |
| 1 | Diisobutyl-ketone. | 32 | 73 | 100 | 73 |
| 2 | do | 4.7 | 5.2 | 98.5 | 5.2 |

A comparison of these results clearly shows that the catalyst having both sulfonic- and carboxylic-acid groups (No. 1) is much more active than the catalyst containing substantially only sulfonic acid groups (No. 2). This difference is especially noticeable with diisobutyl ketone. All materials of this type which contain both sulfonic acid and carboxylic acid groups are active catalysts in the process. However, the ratio between these two groups can vary over wide limits.

According to a preferred form of the invention, a stream of ketene is introduced slowly at a controlled rate into a suspension of the catalyst in the desired ketone or keto-ester while agitating the mixture and maintaining it at a suitable temperature below that at which substantial polymerization of the ketene occurs. An amount of catalyst corresponding to 10% to 20% of the keto-compound gives good results. The reactants and catalyst preferably are dry or anhydrous to minimize side reactions of moisture with the ketene. The temperatures found most efficient vary with the ketone employed, usually ranging from around 40° C. to around 100° C. However, lower and higher temperatures may be used.

A preferred method for the isolation of the enol-esters from the filtrate obtained by filtering the reaction mixture from the main reaction involves the fractional distillation of the filtrate under subatmospheric pressure and the separate recovery of the enol-acetate and of the excess ketone. Since the filtered reaction mixture is free from the catalyst during the distillation step, side reactions such as would result from the presence during this step of an acidic oxidizing catalyst are minimized.

The following examples serve to illustrate the invention. In the examples all parts are given in terms of weight unless otherwise stated.

Example 1

215 parts of ketene gas were introduced into an agitated suspension of 63 parts of the catalyst in 459 parts of cyclohexanone during 5.12 hours while maintaining a reaction temperature of 90° C.–100° C. The suspended catalyst then was filtered from the reaction mixture, the filtrate was fractionally distilled under vacuum, and the cyclohexenyl acetate was separately recovered as a liquid boiling at 78° C. under 20 millimeters of mercury pressure, in a yield of 93.7%, based upon the ketone, and of 86% based upon the ketene, and an efficiency of 100% based on the cyclohexanone consumed in the process.

The catalyst was made by adding 200 parts of 96% sulfuric acid to 150 parts of 4 to 20 mesh hardwood sawdust containing no sulfur and no acid and charring the wood as the temperature rose to 93° C. 400 parts of 20% fuming sulfuric acid were added and the mixture kept at 80° C.–90° C. for 2.5 hours. This product then was washed with water until free from sulfate ion, and was dried in an oven at 90° C. The catalyst contained 2.81% of combined sulfur or 0.88 milliequivalents of sulfonic acid per gram and had a total acidity of 4.47 milliequivalents per gram showing the introduction of 3.59 milliequivalents of carboxyl groups per gram.

Under somewhat similar conditions but wherein the reaction was conducted at 56° C.–78° C., and the catalyst used was made by treating 100 parts of a finely divided synthetic graphite of the nature of a high grade resistor carbon with 200 parts of 20% fuming sulfuric acid for 4.5 hours at 80° C.–90° C., washing the product free from sulfate ions and drying the washed product at 100° C., a lower yield of cyclohexenyl acetate was secured.

Example 2

To a suspension of 47 parts of catalyst R in 394 parts of dry acetone maintained at 55° C.–60° C. were slowly added 130 parts of ketene during 3.1 hours. The catalyst then was filtered off, and the filtrate was fractionally distilled under vacuum, and the isopropenyl acetate was separately recovered as a liquid boiling at 60° C. under a pressure of 200 millimeters of mercury. The yield of isopropenyl acetate was 40.5% based upon the ketone, at an efficiency of 89% based upon the ketone, and 89% based upon the ketene.

Catalyst R was made by treating 100 parts of a bituminous coal of 20–40 mesh size with 400 cc. of 20% fuming sulfuric acid and heating at 80° C. for 2.5 hours. The coal then was washed with water until free from sulfate ion and was dried at 100° C. A portion of this material, having a sulfonic acid content of 1.78 milliequivalents per gram and a carboxylic acid content of 0.60 milliequivalents per gram, was oxidized by heating with five times its weight of 9% aqueous nitric acid at 100° C. for 10 hours. The resultant product was washed with water until free from sulfate and nitrate ions, and was dried at 90° C. Analysis showed 3.71% sulfur, corresponding to 1.16 milliequivalents of sulfonic acid per gram, and 2.84 milliequivalents of carboxylic acid per gram.

Example 3

Into an agitated suspension of 25 parts of the catalyst used in Example 2, in 178 parts of ethyl levulinate, 32 parts of ketene were introduced during 0.75 hour while maintaining the mixture at 63° C.–70° C. The catalyst then was filtered off, and the filtrate was fractionally distilled under vacuum to eliminate unreacted ethyl levulinate. A quantity of the enol acetate, ethyl 3-acetoxy-3-pentenoate, was secured in the form of a colorless liquid, boiling at 89° C. under a pressure of 5 millimeters of mercury.

Examples 4 to 10

Following the general procedure described in Example 2, ketene was reacted with various dry ketones, and with various dry catalysts of the type hereinbefore described. The conditions under which each of such runs were conducted, and the yields of enol acetates secured, are presented in Table II, identified as Examples 4 to 10.

Table II (Section A)

| Example No. | Ketene, Amt. in Grams | Ketonic Compound | | Catalyst | | Reaction Temperature, °C. | Reaction Time, Hours |
|---|---|---|---|---|---|---|---|
| | | Kind | Amt. in Grams | Kind | Amt. in Grams | | |
| 4 | 167 | 2,4-Pentanedione | 456 | Q | 74 | 42–68 | 4.0 |
| 5 | 90 | p-Chloroacetophenone | 480 | N | 89 | 50–80 | 2.15 |
| 6 | 189 | Acetophenone | 507 | O | 65 | 90–100 | 4.5 |
| 7 | 210 | Methyl ethyl ketone | 408 | H | 60 | 60–64 | 5.0 |
| 8 | 217 | Ethylidene acetone | 370 | F | 68 | 80–100 | 3 |
| 9 | 124 | Acetone | 390 | K | 69 | 55–60 | 2.95 |
| 10 | 94 | ...do... | 390 | X | 62 | 55–60 | 2.2 |

Table II (Section B)

| Example No. | Product | Isolation of Product | | Yield of Enol Acetate, Per Cent | | Efficiency, Per Cent | |
|---|---|---|---|---|---|---|---|
| | | Temperature, °C. | Pressure, mm. Hg | On Ketene | On Ketone | On Ketene | On Ketone |
| 4 | 3,-Pentenon-2-yl-4-acetate | 65 | 5 | 46.2 | 40.3 | 46.2 | 71.8 |
| 5 | α-Methylene-p-chlorobenzyl-acetate | 93 | 2 | 12.4 | 8.5 | 12.4 | 54.6 |
| 6 | α-Methylene benzyl acetate | 91 | 4 | 39.3 | 42 | 39.3 | 86.7 |
| 7 | Buten-2-yl-2-acetate | 117–23 | (1) | 50 | 47.7 | 50 | 90 |
| 8 | 1,3-Pentadienyl-2-acetate | 50 | 10 | 43.1 | 29.6 | 43.1 | 61.8 |
| 9 | Isopropenyl acetate | 60 | 200 | 81.4 | 37.9 | 81.4 | 72 |
| 10 | ...do... | 60 | 200 | 65 | 22 | 65 | 90 |

[1] Atmospheric.

The catalysts employed in the runs indicated in Table II were prepared as follows:

Catalyst Q was made by sulfonating 100 parts of a finely divided petroleum coke with 400 parts of 20% fuming sulfuric acid by heating at 80° C. for 2.5 hours and then washing with water until free from sulfate ions, and drying it at 90° C. Analysis showed the presence of 2.19 milliequivalents per gram of sulfonic acid and 1.53 milliequivalents per gram of carboxylic acid.

Catalyst N was made by treating 100 parts of a sulfite process wood pulp with 200 parts of 96% sulfuric acid. The charred pulp was treated with 400 parts of 20% fuming sulfuric acid and the mixture kept at 80°–90° C. for 2.5 hours. The finely divided char was washed free from sulfate ion with water, and was dried in an oven at 100° C. The dried catalyst contained 1.67 milliequivalents per gram of sulfonic acid and 3.67 milliequivalents per gram of carboxylic acid.

Catalyst C was prepared by treating 100 parts of activated charcoal from coconut shells with 300 parts of 20% fuming sulfuric acid and the mixture kept at 80° C.–90° C. for 2.5 hours and then washing with water until free from sulfate ion, and drying it at 90° C. The dried catalyst contained 0.18 milliequivalents per gram of sulfonic acid and 0.49 milliequivalents per gram of carboxylic acid.

Catalyst H is a finely divided sulfonated coal, having a total acidity of 3.1 milliequivalents per gram including 2.28 milliequivalents per gram of sulfonic acid and 0.82 milliequivalents per gram of carboxylic acid. A typical analysis shows carbon 58.3%, hydrogen 3.4%, sulfur 7.3% and nitrogen 1.1%. Such a product is now being marketed under the trade name "Zeo Karb H" as a cation-exchange material.

Catalyst F was made by treating 100 parts of finely divided natural graphite with 200 parts of 20% fuming sulfuric acid for 2.5 hours at 80° C.–90° C., washing the product until free from sulfate ions, and drying at 100° C. This catalyst had a sulfur content of 2.22%.

Catalyst K was made by reacting 100 parts of finely divided solid polyethylene with 400 parts of 20% fuming sulfuric acid for 3 hours at 80° C. and the product washed free of sulfate ions and dried at 90° C. The polyethylene had been reprecipitated from a hot benzene solution by means of n-butanol. The dried product contained 2.25% sulfur, equivalent to 0.704 milliequivalents per gram of sulfonic acid, and 0.236 milliequivalents per gram of carboxylic acid.

Catalyst X was a sulfonated synthetic resin in finely divided form having present therein both sulfonic acid groups and other acidic groups. Such a product is now being marketed under the trade name "Ionac Cation Exchanger Resin C–200–H."

Under generally similar conditions to those of Example 9 but utilizing as catalyst a product made by sulfonating 100 parts of a 40 mesh by-product coke with 400 parts of 20% fuming sulfuric acid at 80° C.–90° C. for 2.5 hours, washing the product free from sulfate ions and drying at 100° C., a somewhat smaller yield of isopropenyl acetate was obtained than in Example 9.

*Example 11*

To an agitated suspension of 10 parts of a catalyst made from a bone charcoal in 913 parts of ethyl acetoacetate heated to 85° C. were added 99 parts of ketene during one hour, maintaining the mixture at 80° C.–90° C. The catalyst then was removed by filtration and the filtrate was fractionally distilled under vacuum, yielding, in addition to unreacted ethyl acetoacetate, ethyl 3-acetoxycrotonate in yield of 26.5% as a liquid boiling at 89° C.–90° C. under a pressure of 10 millimeters of mercury, and having a specific gravity at 20° C./15.5° C. of 1.102, and a refractive index at 30° C. of 1.4675. The efficiency was 92%, based upon the ethyl acetoacetate.

The catalyst was prepared by reacting 100 parts of 40-mesh animal bone charcoal containing 0.18% sulfur and no acid with 400 parts of 20% fuming sulfuric acid for 2 hours at 80° C.–90° C. The catalyst then was washed with water until the water effluent was free from the sulfate ion, and then was dried at 100° C. The dried catalyst contained 1.10% sulfur, equivalent to 0.287 milliequivalents of sulfonic acid per gram, and 0.64 milliequivalents of total acid per gram.

The following data illustrate the unusually long effective catalytic life possessed by the catalysts of the foregoing type in the production of enol esters from ketene and ketones.

Into a stirred suspension of 78 grams of catalyst H in 396 grams of anhydrous acetone heated to 55° C.–60° C. a stream of gaseous ketene was fed at the rate of 42 grams (one mol) per hour until between 130 and 140 grams of ketene were absorbed. This required from 3.3 to 4.0 hours. The suspended catalyst was filtered from the reaction mixture, the filtrate was fractionally distilled under vacuum, and isopropenyl acetate was separately recovered as a product boiling at 58° C.–60° C. under 200 millimeters of mercury pressure.

The filtered catalyst from the above run was contacted with another charge of 396 grams of acetone and the run was repeated substantially as above described. This cycle was repeated in like manner nine times, after which the recovered catalyst had lost some of its activity. This was restored by washing the catalyst with acetone to remove organic material, and then successively washing with water to remove the acetone, treating with 500 cc. of 10% aqueous sulfuric acid, washing with water until free from sulfate ions, and then drying the product. The reactivated catalyst weighed 67 grams. It was mixed with another 396 gram portion of acetone and the cycle repeated.

Table III is based upon the results secured in the aforesaid series of runs, and illustrates the long effective life of these catalysts in the ketene-ketone reaction producing enol acetates. This is a great improvement over the usual mineral acid catalysts used for this type of reaction and which, if not destroyed prior to the distillation of the reaction mixture, attacks and resinifies or discolors the enol acetates, with resultant decreased yield and purity.

*Table III*

| Cycle No. | Yield, Weight, Per Cent, based upon Acetone | Efficiency, Per Cent, | |
| --- | --- | --- | --- |
| | | Based on Acetone | Based on Ketene |
| 1 | 15.7 | 44.6 | 31.1 |
| 2 | 37 | 76.2 | 73.8 |
| 3 | 50.3 | 85.5 | 84.1 |
| 4 | 48.2 | 93.2 | 92.0 |
| 5 | 46.1 | 94.8 | 79.8 |
| 6 | 41.3 | 80.7 | 71.6 |
| 7 | 32.1 | 78.9 | 74.5 |
| 8 | 36.2 | 77.1 | 73.6 |
| 9 | 38.7 | 80.0 | 76.9 |
| 10 | 42.3 | 92.6 | 74.6 |

It will be evident that use of heterogeneous, fixed-carbon containing catalysts of the type hereindescribed inhibits or limits side reactions both in the condensation step and in the product isolation and recovery steps.

Where not further modified, the terms "the ketones" and "a ketone" are used in the accompanying claims to designate both the unsubstituted saturated and olefinic aliphatic ketones, aromatic ketones and mixed ketones having only carbon, hydrogen and oxygen in the molecule, the corresponding halogen-substituted ketones, and the saturated aliphatic diketones, having at least three hydrogen atoms connected with the carbon atoms alpha to a keto carbon atom, such as those mentioned herein.

The invention is susceptible of modification within the scope of the appended claims.

I claim:

1. In the process for producing enol acetates, the step which comprises intimately mixing and condensing at an elevated temperature successive portions of ketene with a ketonic compound selected from the class consisting of the ketones and the ketonic carboxylic acid esters respectively having at least three hydrogen atoms connected with the carbon atoms alpha to a keto carbon atom, in the presence of a heterogeneous solid sulfonation and partial oxidation product of a solid carbonaceous material, which product contains both sulfonic acid groups and carboxylic acid groups and is insoluble in said ketonic compound.

2. In the process for producing enol acetates, the step which comprises intimately mixing and condensing successive portions of ketene with a ketonic compound selected from the class consisting of the ketones and the ketonic carboxylic acid esters respectively having at least three hydrogen atoms connected with the carbon atoms alpha to a keto carbon atom, at an elevated temperature, in the presence of a heterogeneous solid product of the sulfonation and partial oxidation of a carbonaceous material of cellular structure, said product being substantially insoluble in said ketonic compound and in said enol acetate and containing both sulfonic acid and carboxylic acid groups.

3. In the process for producing enol acetates, the step which comprises intimately mixing and condensing at an elevated temperature successive portions of ketene with a ketonic compound selected from the class consisting of the ketones and the ketonic carboxylic acid esters respectively having at least three hydrogen atoms connected with the carbon atoms alpha to a keto carbon atom, in the presence of a heterogeneous solid product of the sulfonation under partial oxidation conditions of a carbonaceous material of vegetable origin, which product contains sulfonic acid groups and carboxylic acid groups.

4. In the process for producing enol acetates, the step which comprises intimately mixing and condensing at an elevated temperature successive portions of ketene with a ketonic compound selected from the class consisting of the ketones and the ketonic carboxylic acid esters respectively having at least three hydrogen atoms connected with the carbon atoms alpha to a keto carbon atom, in the presence of a sulfonated synthetic resin containing a sulfonic acid group and a carboxylic acid group.

5. In the process for producing enol acetates, the step which comprises intimately mixing and condensing at an elevated temperature successive portions of ketene with a ketonic compound selected from the class consisting of the ketones and the ketonic carboxylic acid esters respectively having at least three hydrogen atoms connected with the carbon atoms alpha to a keto carbon atom, in the presence of a charred ketone-insoluble carbonaceous material having a cellular structure and containing both sulfonic acid groups and carboxylic acid groups.

6. In the process for producing enol acetates, the step which comprises intimately mixing and condensing at an elevated temperature successive portions of ketene with a ketone having at least three hydrogen atoms connected with the carbon atoms alpha to a keto carbon atom, in the presence of a ketone-insoluble solid product of the sulfonation of a carbonaceous material of cellulosic origin under partial oxidizing conditions, said product containing both sulfonic acid groups and carboxylic acid groups.

FRANK G. YOUNG.

No references cited.